US011347041B2

(12) United States Patent
Tsunai

(10) Patent No.: US 11,347,041 B2
(45) Date of Patent: May 31, 2022

(54) IMAGE CAPTURING APPARATUS

(71) Applicant: NIKON CORPORATION, Tokyo (JP)

(72) Inventor: Shiro Tsunai, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 50 days.

(21) Appl. No.: 16/235,836

(22) Filed: Dec. 28, 2018

(65) Prior Publication Data

US 2019/0137741 A1    May 9, 2019

Related U.S. Application Data

(63) Continuation of application No. PCT/JP2017/024248, filed on Jun. 30, 2017.

(30) Foreign Application Priority Data

Jun. 30, 2016 (JP) .............................. JP2016-130901

(51) Int. Cl.
*G02B 21/34* (2006.01)
*G02B 21/00* (2006.01)
(Continued)

(52) U.S. Cl.
CPC .......... *G02B 21/008* (2013.01); *G02B 21/34* (2013.01); *G02B 21/365* (2013.01); *G03B 15/00* (2013.01);
(Continued)

(58) Field of Classification Search
CPC .... G02B 21/008; G02B 21/34; G02B 21/365; G03B 15/00; G03B 15/02; H04N 5/2254; H04N 5/2258; H04N 5/369; H04N 5/374
(Continued)

(56) References Cited

U.S. PATENT DOCUMENTS 5,822,125 A * 10/1998 Meyers ............... H04N 5/2254
  359/621
5,844,289 A   12/1998 Teranishi et al.
(Continued)

FOREIGN PATENT DOCUMENTS

JP    H04-188872 A    7/1992
JP    H09-312385 A    12/1997
(Continued)

OTHER PUBLICATIONS

Jan. 1, 2019 International Preliminary Report on Patentability issued in International Patent Application PCT/JP2017/024248.
(Continued)

*Primary Examiner* — Thong Q Nguyen
(74) *Attorney, Agent, or Firm* — Oliff PLC

(57) ABSTRACT

An image capturing apparatus includes an image capturing device that has a plurality of photoelectric converting elements, and a light restricting portion that has a plurality of light inlets and a plurality of light outlets provided to each of the plurality of photoelectric converting elements, that emits, to each of the plurality of photoelectric converting elements, light that can reach each of the plurality of light inlets among light incident on each of the plurality of light outlets and that restricts light that cannot reach each of the plurality of light outlets among the light incident on the light inlets from being emitted to each of the plurality of photoelectric converting elements.

20 Claims, 9 Drawing Sheets

(51) Int. Cl.
- *G03B 15/00* (2021.01)
- *H04N 5/225* (2006.01)
- *G02B 21/36* (2006.01)
- *H04N 5/369* (2011.01)
- *H04N 9/07* (2006.01)
- *G03B 15/02* (2021.01)
- *H04N 5/374* (2011.01)
- *H04N 9/04* (2006.01)

(52) U.S. Cl.
CPC ........... *G03B 15/02* (2013.01); *H04N 5/2254* (2013.01); *H04N 5/2258* (2013.01); *H04N 5/369* (2013.01); *H04N 5/374* (2013.01); *H04N 9/07* (2013.01); *H04N 9/045* (2013.01)

(58) Field of Classification Search
USPC .......................... 359/601, 613, 614, 368–398
See application file for complete search history.

(56) References Cited

U.S. PATENT DOCUMENTS

| | | | | |
|---|---|---|---|---|
| 2007/0097512 A1* | 5/2007 | Toyoda | ................... | G02B 7/021 |
| | | | | 359/626 |
| 2010/0278478 A1* | 11/2010 | Kuo | ..................... | G02B 6/2808 |
| | | | | 385/24 |
| 2015/0370011 A1 | 12/2015 | Ishihara | | |

FOREIGN PATENT DOCUMENTS

| | | |
|---|---|---|
| JP | 2005-99736 A | 4/2005 |
| JP | 2015-111762 A | 6/2015 |
| JP | 2016-5197 A | 1/2016 |

OTHER PUBLICATIONS

Sep. 19, 2017 International Search Report issued in International Patent Applicaiton PCT/JP2017/024248.
Feb. 12, 2020 Office Action issued in Japanese Patent Application No. 2018-525316.
Jul. 23, 2020 Office Action issued in Chinese Patent Application No. 201780051259.0.

* cited by examiner

IMAGE CAPTURING APPARATUS

CROSS REFERENCE TO RELATED APPLICATION

This is a continuation of International Application No. PCT/JP2017/024248 filed on Jun. 30, 2017, which claims priority from Japanese Patent Application No. 2016-130901 filed in Japan on Jun. 30, 2016. The contents of each of the above-identified patent applications is incorporated herein by reference in its entirety.

BACKGROUND

1. Technical Field

The present invention relates to an image capturing apparatus.

2. Related Art

Conventionally, an image capturing apparatus that generates an all-in-focus image of a subject has been known. However, a conventional image capturing apparatus has needed to respectively obtain image data on a plurality of focus positions.

PRIOR ART LITERATURE

Patent Document

[Patent document 1] Japanese Patent Application Publication No. 2005-99736

SUMMARY

In a first aspect, an image capturing apparatus includes an image capturing device that has a plurality of photoelectric converting elements, and a light restricting portion that has a plurality of light inlets and a plurality of light outlets provided to each of the plurality of photoelectric converting elements, that emits, to each of the plurality of photoelectric converting elements, light that can reach each of the plurality of light outlets among light incident on each of the plurality of light inlets, and that restricts light that cannot reach each of the plurality of light outlets among the light incident on the light inlets from being emitted to each of the plurality of photoelectric converting elements.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
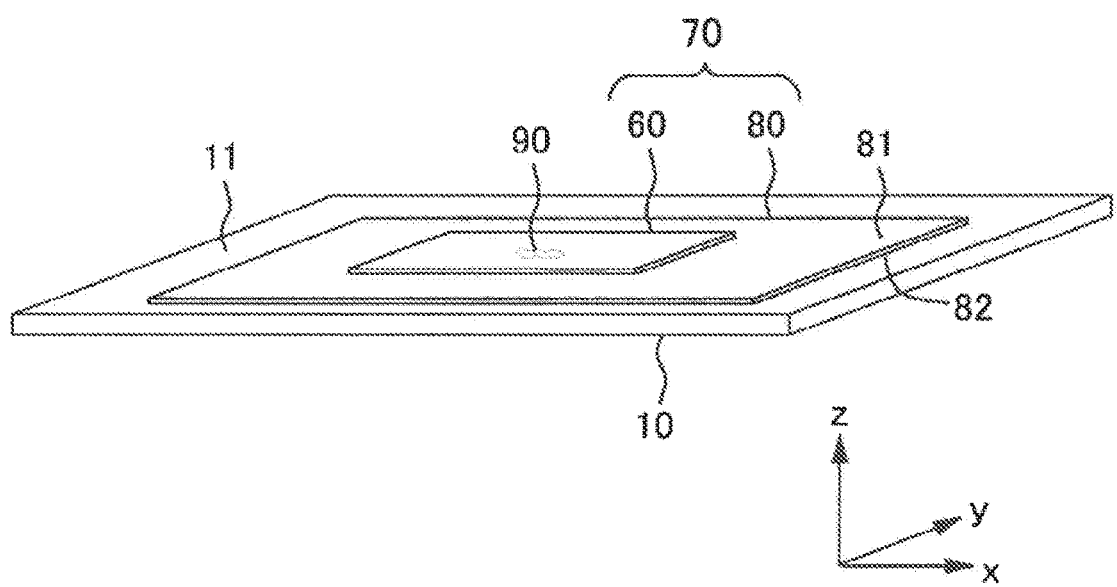
FIG. 1 schematically shows a usage example of a microscope system 5 according to a first embodiment.

FIG. 1 schematically shows a usage example of a microscope system 5 according to a first embodiment. The microscope system 5 includes a microscope apparatus 10 and a preparation 70. The microscope apparatus 10 captures an image of a sample 90 provided on the preparation 70. Note that the microscope system 5 is one example of an image capturing system. The microscope apparatus 10 is one example of an image capturing apparatus. The sample 90 is one example of a subject.

The preparation 70 has a slide glass 80 and a cover glass 60. The cover glass 60 and the slide glass 80 have light transparency. The sample 90 is mounted on the slide glass 80. The sample 90 is provided by being sandwiched between the slide glass 80 and the cover glass 60. Specifically, the slide glass 80 has a first principle surface 81 and a second principle surface 82 that is a surface on an opposite side to the first principle surface 81. The sample 90 is mounted on the first principle surface 81 of the slide glass 80. The sample 90 is provided by being sandwiched between the cover glass 60 and the first principle surface 81 of the slide glass 80.

The microscope apparatus 10 has a mounting surface 11 to mount the preparation 70. The preparation 70 is mounted on the mounting surface 11 of the microscope apparatus 10. Specifically, the preparation 70 is mounted on the microscope apparatus 10 so that the second principle surface 82 of the slide glass 80 is in contact with the microscope apparatus 10. The microscope apparatus 10 captures an image of the sample 90 in a state in which the preparation 70 is mounted on the mounting surface 11.

The microscope apparatus 10 outputs generated image data to an apparatus such as an output apparatus such as a monitor or a printer, or a recording apparatus such as a storage medium. The microscope apparatus 10 may include an apparatus being an output destination of the image data. The apparatus being the output destination of the image data may be an external apparatus other than the microscope apparatus 10.

In the present embodiment, a direction vertical to the mounting surface 11 of the microscope apparatus 10 is defined as a z-axis direction. A direction from the sample 90 toward the microscope apparatus 10 is defined as a negative direction along the z axis, and an opposite direction to the direction is defined as a positive direction along the z axis. The x axis, the y axis and the z axis form an orthogonal coordinate system being a right-hand system. In each drawing, to show the direction of each axis of the coordinate system, a coordinate axis may be added to the drawings. Note that for convenience of descriptions, the positive direction along the z axis may be considered as an upper direction and the negative direction along the z axis may be considered as a lower direction.

Figure 2:
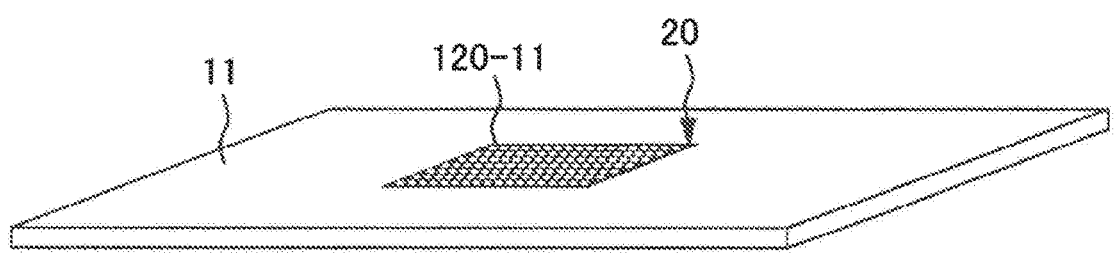
FIG. 2 schematically shows a perspective view of a microscope apparatus 10.
Figure 2:
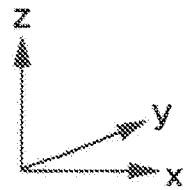

FIG. 2 schematically shows a perspective view of the microscope apparatus 10. The microscope apparatus 10 has an imaging module 20. The imaging module 20 captures an image of the sample 90. The imaging module 20 selects light in a direction substantially along the z axis among light from the first principle surface 81 of the slide glass 80 passing through the second principle surface 82 and toward the imaging module 20 to capture an image of the sample 90.

The imaging module 20 has a plurality of light inlets including a light inlet 120-11. The imaging module 20 captures an image of the sample 90 by separately receiving and photoelectrically converting, by a plurality of photoelectric converting elements, light in the direction substantially along the z axis among light respectively incident on the plurality of light inlets including the light inlet 120-11. The microscope apparatus 10 generates image data of the sample 90 based on a pixel signal obtained by photoelectrically converting by the plurality of photoelectric converting elements in the imaging module 20.

Figure 3:
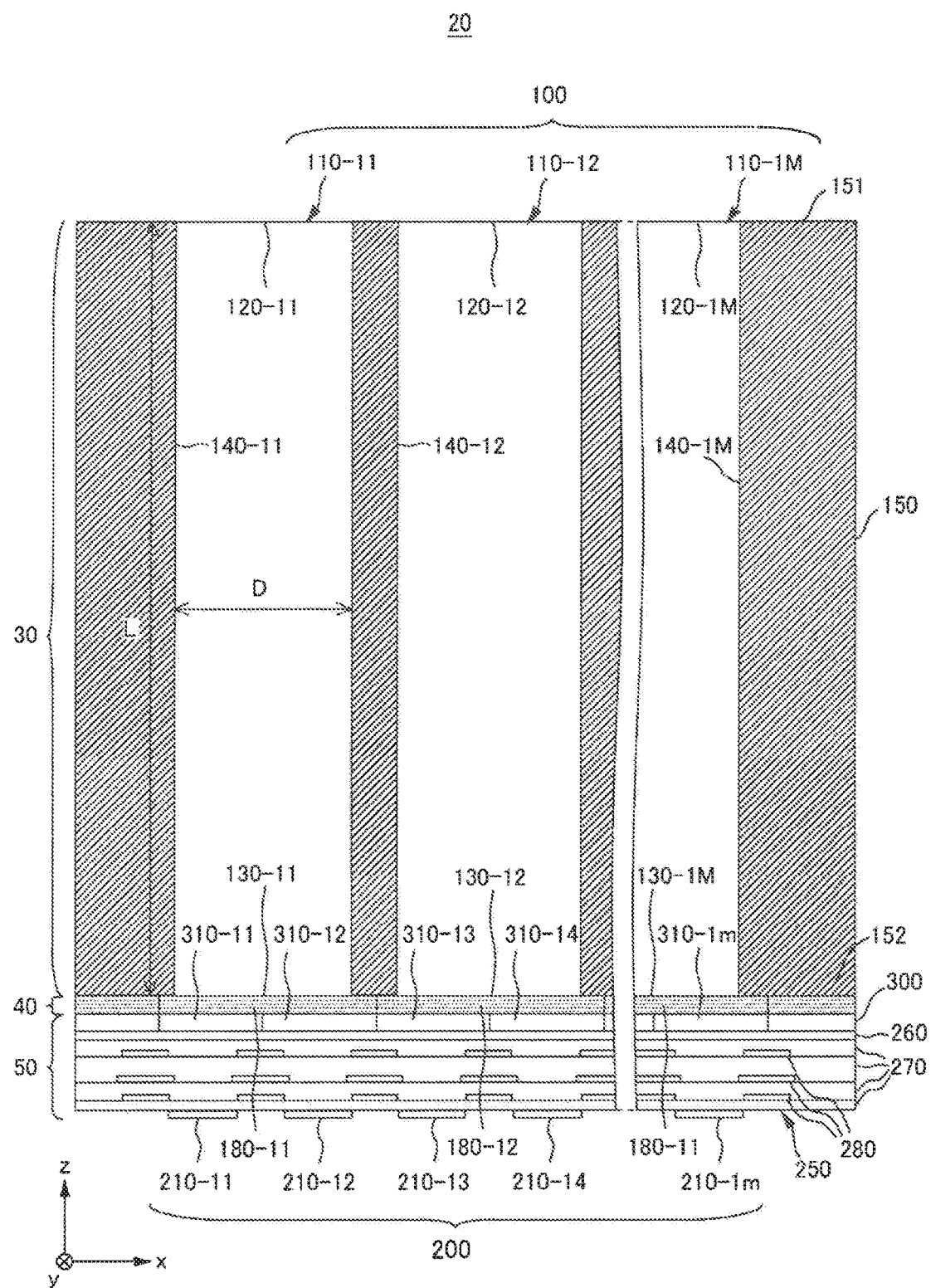
FIG. 3 schematically shows a cross-sectional view obtained by cutting an imaging module 20 at a plane parallel to an xz plane.
Figure 4A:
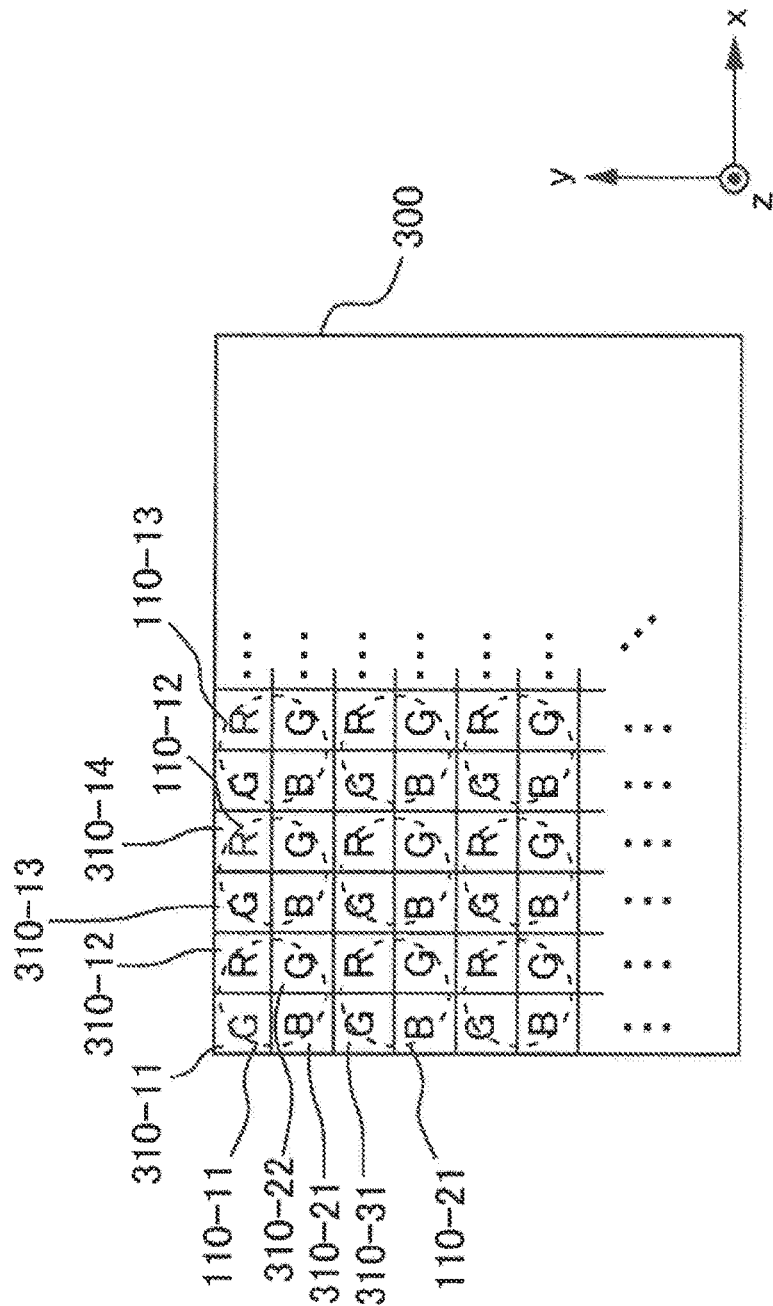
FIG. 4A schematically shows a cross-sectional view obtained by cutting the imaging module 20 at a plane parallel to an xy plane.

FIG. 3 schematically shows a cross-sectional view obtained by cutting the imaging module 20 at a plane parallel to the xz plane. FIG. 4A schematically shows a cross-sectional view obtained by cutting the imaging module 20 at a plane parallel to the xy plane.

The imaging module 20 has a light restricting portion 30, a light diffusing portion 40 and an image capturing unit 50. The image capturing unit 50 is an image capturing device. The image capturing unit 50 is a solid-state image capturing device such as a CMOS image sensor or a CCD image sensor, for example. The image capturing unit 50 is a color image sensor of a Bayer type array, for example. The image capturing unit 50 provides a single-plate image capturing portion.

The image capturing unit 50 has a color filter portion 300, a substrate portion 250 and a photoelectric converting element portion 200. The substrate portion 250 includes a passivation layer 260, a wiring layer 280 and an insulation layer 270. The color filter portion 300 is provided between the light diffusing portion 40 and the passivation layer 260. In the image capturing unit 50, the color filter portion 300, the substrate portion 250 and the photoelectric converting element portion 200 are provided along the negative direction along the z axis in an order of the color filter portion 300, the substrate portion 250 and the photoelectric converting element portion 200.

The color filter portion 300 has a plurality of color filters including a color filter 310-11 to a color filter 310-1m. The plurality of color filters included in the color filter portion 300 are arrayed in a matrix of n rows×m columns. Here, n and m may be an integer equal to or more than 2. A color filter positioned on the ith row and the jth column may be called as a color filter 310-ij by adding "-ij" to the reference sign of the color filter as a suffix to the reference sign. Also, the plurality of color filters included in the color filter portion 300 may be collectively called as the color filters 310.

Note that FIG. 4A shows a cross-sectional view obtained by cutting the color filter portion 300 at a plane parallel to the xy plane. In FIG. 4A, a letter "R" is added to a color filter that has a spectral characteristic passing light in a red wavelength range through the color filter. A letter "G" is added to a color filter that has a spectral characteristic passing light in a green wavelength range trough the color filter. A letter "B" is added to a color filter that has a spectral characteristic passing light in a blue wavelength range through the color filter. As shown in FIG. 4A, four color filters 310 of 2 rows×2 columns form one unit lattice of a Bayer array. For example, the color filter 310-11, a color filter 310-12, a color filter 310-21 and a color filter 310-22 form one unit lattice of the Bayer array.

A passivation layer 260 is positioned on the positive side along the z axis of the substrate portion 250 to provide a principle surface of the substrate portion 250 on the positive side along the z axis. A photoelectric converting element portion 200 is provided on the principle surface of the substrate portion 250 on the negative side along the z axis.

The photoelectric converting element portion 200 provides a photoelectric converting portion of the image capturing device. The photoelectric converting element portion 200 has a plurality of photoelectric converting elements including a photoelectric converting element 210-11 to a photoelectric converting element 210-1m. The plurality of photoelectric converting elements included in the photoelectric converting element portion 200 are arrayed in a matrix of n rows×m columns. A photoelectric converting element positioned on the ith row and the jth column may be called as a photoelectric converting element 210-ij by adding "-ij" to the reference sign of the photoelectric converting element as a suffix to the reference sign. Also, the plurality of photoelectric converting elements included in the photoelectric converting element portion 200 may be collectively called as the photoelectric converting elements 210.

The photoelectric converting element 210 is one example of each pixel device. The color filter 310 is provided to the photoelectric converting element 210 in one-to-one correspondence. Light passing through each color filter 310 is incident on the respectively-corresponding photoelectric converting element 210. For example, light passing through the color filter 310-11 is incident on the photoelectric converting element 210-11, and light passing through the color filter 310-12 is incident on the photoelectric converting element 210-12.

The photoelectric converting element 210 generates electric charges by using the incident light. The photoelectric converting element 210 has a photoelectric conversion function for converting the incident light into electric charges. The photoelectric converting element 210 accumulates the photoelectrically converted electric charges. The microscope apparatus 10 generates a photoelectric conversion signal by using the electric charges respectively accumulated in the photoelectric converting element 210. That is, the microscope apparatus 10 generates the image data of the subject by using the electric charges accumulated in the photoelectric converting element 210.

The light restricting portion 30 provides a function for emitting, to the image capturing unit 50, light in a specific direction (a first direction) among light from the sample 90. Specifically, the light restricting portion 30 emits, toward the image capturing unit 50, light in the direction substantially along the z axis among light incident on the light restricting portion 30 (the z-axis direction is the first direction). Accordingly, the image capturing unit 50 can receive light selected from among the light from the sample 90. The light restricting portion 30 can provide a similar function to a function of an imaging optical system, without having the imaging optical system such as an imaging lens. The microscope apparatus 10 does not have an imaging optical system in an optical path from the sample 90 to the light inlet 120. Also, the microscope apparatus 10 does not have an imaging optical system on an optical path from the sample 90 to the light diffusing portion 40. Also, the microscope apparatus 10 does not have an imaging optical system on an optical path from the sample 90 to the image capturing unit 50.

The light tube portion 100 has a plurality of light tubes including a light tube 110-11 to a light tube 110-1M. The plurality of light tubes included in the light tube portion 100 are arrayed in a matrix of N rows×M columns. Here, N and M may be an integer equal to or more than 2. A light tube positioned on the ith row and the jth column may be called as a light tube 110-*ij* by adding "-ij" to the reference sign of the light tube as a suffix to the reference sign. Also, the plurality of light tubes included in the light tube portion 100 may be collectively called as the light tubes 110.

Each light tube 110 is one example of the light passing portion. The light tube 110 has a tubular shape. For example, the light tube 110 has a cylindrical shape. Each light tube 110 is a through hole formed in a base body 150, for example. Each light tube 110 is a through hole that penetrates, along the z axis, from a first principle surface 151 to a second principle surface 152 of the base body 150.

The light tube 110-11 is formed by a light inlet 120-11, a light outlet 130-11 and a side wall 140-11. The side wall 140-11 connects the light inlet 120-11 and the light outlet 130-11. Similar to the light tube 110-11, the light tube 110 other than the light tube 110-11 is also formed by the light inlet, the light outlet and the side wall.

Note that when identifying and describing the light inlet, the light outlet and the side wall that form the light tube 110-*ij*, the "-ij" may be added as a suffix to each reference sign for the description. For example, a light tube 110-12 is formed by a light inlet 120-12, a light outlet 130-12 and a side wall 140-12 connecting the light inlet 120-12 and the light outlet 130-12. Also, the plurality of light inlets included in the imaging module 20 may be collectively called as the light inlets 120. Also, the plurality of light outlets 130 included in the imaging module 20 may be collectively called as the light outlets 130. Also, the plurality of side walls 140 included in the imaging module 20 may be collectively called as the side walls 140.

In this manner, each light tube 110 is formed by the light inlet 120, the light outlet 130 and the side wall 140 connecting the light inlet 120 and the light outlet 130. Light being incident on the light inlet 120, passing through the light tube 110 and being emitted from the light outlet 130 is incident on the light diffusing portion 40.

The light diffusing portion 40 diffuses the incident light and emits the light to the image capturing unit 50. The light diffusing portion 40 has a plurality of light diffusing devices including a light diffusing device 180-11 to a light diffusing device 180-1M. The plurality of light diffusing devices included in the light diffusing portion 40 are arrayed in a matrix of N rows×M columns. A light diffusing device positioned on the ith row and the jth column may be called as a light diffusing device 180-*ij* by adding "-ij" to the reference sign of the light diffusing device as a suffix to the reference sign. Also, the plurality of light diffusing devices included in the light diffusing portion 40 may be collectively called as the light diffusing devices 180.

The light diffusing device 180 is provided to the light tube 110 in one-to-one correspondence. The light diffusing device 180 is provided on a position on the negative side along the z axis of the light outlet 130 of the light tube 110, the position covering the light outlet 130-11. Note that the light diffusing device 180 may be a light scattering device including a light scattering device such as a microparticle, for example. Also, the light diffusing portion 40 may also be formed of one piece of sheet-like sheet member such as a light diffusion film.

In FIG. 4A, a position on which the light tube 110 is projected onto the z-axis direction is shown by dotted lines. Each light tube 110 is provided correspondingly to four photoelectric converting elements 210 that correspond to one unit lattice of the Bayer array. Each light passing through the light tube 110 and reaching the light outlet 130 is diffused by the light diffusing portion 40 and is incident on four photoelectric converting elements 210 of the corresponding unit lattice.

Specifically, as shown in FIG. 4A and the like, the light tube 110-11 is provided so that a position of a central axis of the light tube 110-1 is positioned relative to a central position of the unit lattice formed by the color filter 310-11, the color filter 310-12, the color filter 310-21 and the color filter 310-22. In this manner, the light tube 110-11 is provided correspondingly to the color filter 310-11, the color filter 310-12, the color filter 310-21 and the color filter 310-22. Therefore, the light tube 110-11 is provided correspondingly to the photoelectric converting element 210-11, the photoelectric converting element 210-12, the photoelectric converting element 210-21 and the photoelectric converting element 210-22. Light passing through the light tube 110-11 and reaching the light outlet 130-11 passes through the light diffusing device 180 and the color filter 310 that correspond to the light tube 110-11, and is incident on the photoelectric converting element 210-11, the photoelectric converting element 210-12, the photoelectric converting element 210-21 and the photoelectric converting element 210-22. In this manner, the light being incident on the light inlet 120, passing through the light tube 110 and being emitted from the light outlet 130 is incident on the photoelectric converting element 210 that is provided correspondingly to the light tube 110.

In this manner, each photoelectric converting element 210 receives light belonging to a specific wavelength range among the light being emitted from each light outlet 130 of the corresponding light tube 110 and being diffused by the light diffusing portion 40. For example, the photoelectric converting element 210-11 and the photoelectric converting element 210-22 are provided to the light outlet 130-11 and receive light belonging to the green wavelength range among the light being emitted from the light outlet 130-11 and being diffused by the light diffusing device 180-11. Also, the photoelectric converting element 210-12 is provided to the light outlet 130-11 and receives light belonging to the red wavelength range among the light being emitted from the light outlet 130-11 and being diffused by the light diffusing device 180-11. Also, the photoelectric converting element 210-21 is provided to the light outlet 130-11, and receives light belonging to the blue wavelength range among the light being emitted from the light outlet 130-11 and being diffused by the light diffusing device 180-11. By providing the light diffusing portion 40, directivity of light emitted from one light tube 110 can be reduced. Accordingly, the light toward the photoelectric converting element 210 within one unit lattice of the Bayer array can be approximately uniformized.

Note that each of the photoelectric converting element 210-11 and the photoelectric converting element 210-22 is one example of a first photoelectric converting element that is provided to the light outlet 130-11 and receives light in a first wavelength range among the light being emitted from the light outlet 130-11 and being diffused by the light diffusing portion 40. Also, the photoelectric converting element 210-12 is one example of a second photoelectric converting element that is provided to the light outlet 130-11 and receives light in a second wavelength range among the light being emitted from the light outlet 130-11 and being diffused by the light diffusing portion 40. Also, the photoelectric converting element 210-21 is one example of a third photoelectric converting element that is provided to the light outlet 130-11 and receives light in a third wavelength range among the light being emitted from the light outlet 130-11 and being diffused by the light diffusing portion 40.

Here, the side wall 140 is restricted from reflecting light. For example, the side wall 140 absorbs light being incident on the side wall 140. In this manner, in the light restricting portion 30, each light inlet 120 and each light outlet 130 are connected by the light tube 110 and the side wall 140 of each light tube 110 is restricted from reflecting light. Therefore, for example, among the light incident on the light inlet 120-11, substantially only the light that reaches the light outlet 130-11 by straightly travelling into the light tube 110-11 without being incident on the side wall 140-11 is incident on the photoelectric converting element 210 corresponding to the light tube 110-11. Also, the light incident on the light tube 110 other than the light tube 110-11 is substantially not incident on the photoelectric converting element 210 corresponding to the light tube 110-11.

Note that the side wall 140 may be formed of a material that has a low light reflectivity. The side wall 140 may be formed of a material that provides more light absorptivity than light reflectivity. The color of the side wall 140 may be black. The side wall 140 may be formed of carbon and the like. For example, the material forming the base body 150 may be carbon and the light incident on the side wall 140 may be absorbed by carbon.

In this manner, the light restricting portion 30 has a light inlet 120 and a light outlet 130 provided to each photoelectric converting element 210. The light restricting portion 30 emits, to each photoelectric converting element 210, the light that can straightly travel into and reach each light outlet 130 among the light incident on each light inlet 120, and restricts the light that cannot straightly travel into and reach each light outlet 130 among the light incident on each light inlet 120 from being emitted to each photoelectric converting element 210.

The light tube 110 selects light in a direction within a predetermined minute solid angle around a direction along the z axis (the first direction) among light from a corresponding position of the sample 90 toward the light restricting portion 30, and emits the selected light to a corresponding photoelectric converting element 210. For that reason, the light incident on each photoelectric converting element 210 is, so to speak, limited to the light from each portion that is right above each photoelectric converting element 210. Therefore, according to the microscope apparatus 10, within a plane parallel to the xy plane in space on the subject side, an area of a region for emitting light that can be received by each photoelectric converting element 210 can be made small. For that reason, according to the microscope apparatus 10, so to speak, an image capturing can be performed in a deep depth of field.

Here, the area of the region for emitting light that can be received by each photoelectric converting element 210 is determined by an aperture diameter D of the light inlet 120 and of the light outlet 130 within a flat plane parallel to the xy plane, and a length L of the light tube portion 100 in the z-axis direction. For example, as F is defined by L/D, the depth of field is determined in accordance with a value of F. As the value of F is large because the length L of the light tube portion 100 is greater than the aperture diameter D of the light inlet 120 and the light outlet 130, the depth of field becomes deep. Therefore, based on F determined in accordance with the depth of field required by the microscope apparatus 10, at least one of the aperture diameter D and L may be designed. For example, L may be determined based on the aperture diameter D that is based on a pitch of the photoelectric converting element 210, and the depth of field that is required by the microscope apparatus 10.

Note that the light tube 110 may be filled with air. As another example, the light tube 110 may be filled with a material having a uniform refractive index. In a case in which the light tube 110 is filled, it is preferable that in the light inlet 120 a difference between an incident angle and a refracting angle of light on a boundary surface between a filling medium and an incident-side medium is smaller than a predetermined value. It is preferable that a difference between a refractive index of the filling medium and a refractive index of the incident-side medium is less than a predetermined value. If the incident-side medium is air, it is preferable than the refractive index of the material with which the light tube 110 is filled is close to that of the air.

Note that in the imaging module 20, one light tube 110 is provided correspondingly to each unit lattice of the Bayer array. As a pixel array of the image capturing unit 50, various arrays other than the Bayer array may be applied.

Figure 4B:
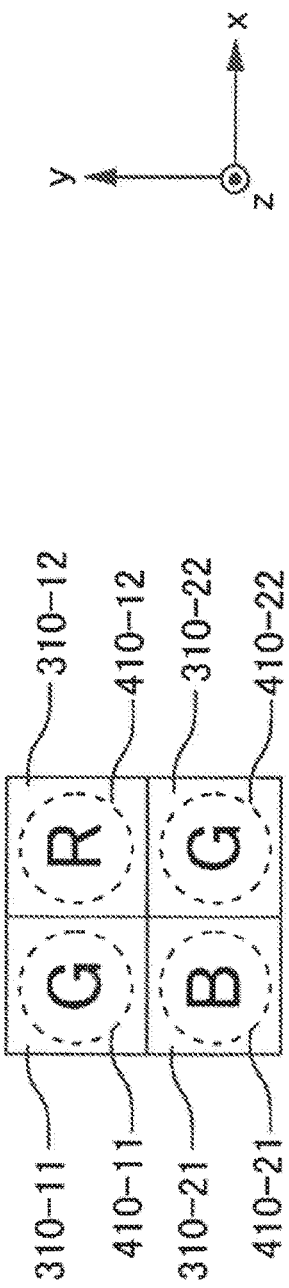
FIG. 4B schematically shows a cross-sectional view obtained by cutting the imaging module 20 at a plane parallel to the xy plane.

FIG. 4B shows a modification example in which one light tube is provided to each photoelectric converting element 210. FIG. 4B is an enlarged cross-sectional view of a portion corresponding to a unit lattice including the color filter 310-11, the color filter 310-12, the color filter 310-21 and the color filter 310-22 in FIG. 4A.

As shown in FIG. 4B, the light tube 410-11 is provided to the color filter 310-11. The light tube 410-12 is provided to the color filter 310-12. The light tube 410-21 is provided to the color filter 310-21. The light tube 410-22 is provided to the color filter 310-22. Note that the light tube 410-11, the light tube 410-12, the light tube 410-21 and the light tube 410-22 may be collectively called as light tubes 410.

As shown in FIG. 4B, one light tube 410 is provided to each of the color filter 310-11, the color filter 310-12, the color filter 310-21 and the color filter 310-22. As described above, the color filter 310 and the photoelectric converting element 210 are provided in one-to-one correspondence. Therefore, one light tube 410 is provided to each photoelectric converting element 210.

Each light tube 410 is provided so that the light outlet of each light tube 410 is positioned on an inner side of four sides of a corresponding photoelectric converting element 210 on a plane parallel to the xy plane. On the cross section obtained by cutting the light tube 410 at a plane parallel to the xy plane, a length of a diameter of the light outlet of each light tube 410 may be shorter than a length of one side of the photoelectric converting element 210. In a case in which the photoelectric converting element 210 has a shorter side and a longer side, the length of the diameter of the light outlet of each light tube 410 may be shorter than a length of the shorter side of the photoelectric converting element 210 on the cross section obtained by cutting the light tube 410 at a plane parallel to the xy plane. Except these respects, a similar configuration to that of the light tube 110 can be applied to each light tube 410. In FIG. 4B, although only the portion corresponding to the unit lattice is shown, one light tube similar to the light tube 410 may also be provided to each of another color filter 310 and a corresponding photoelectric converting element 210.

Figure 4C:
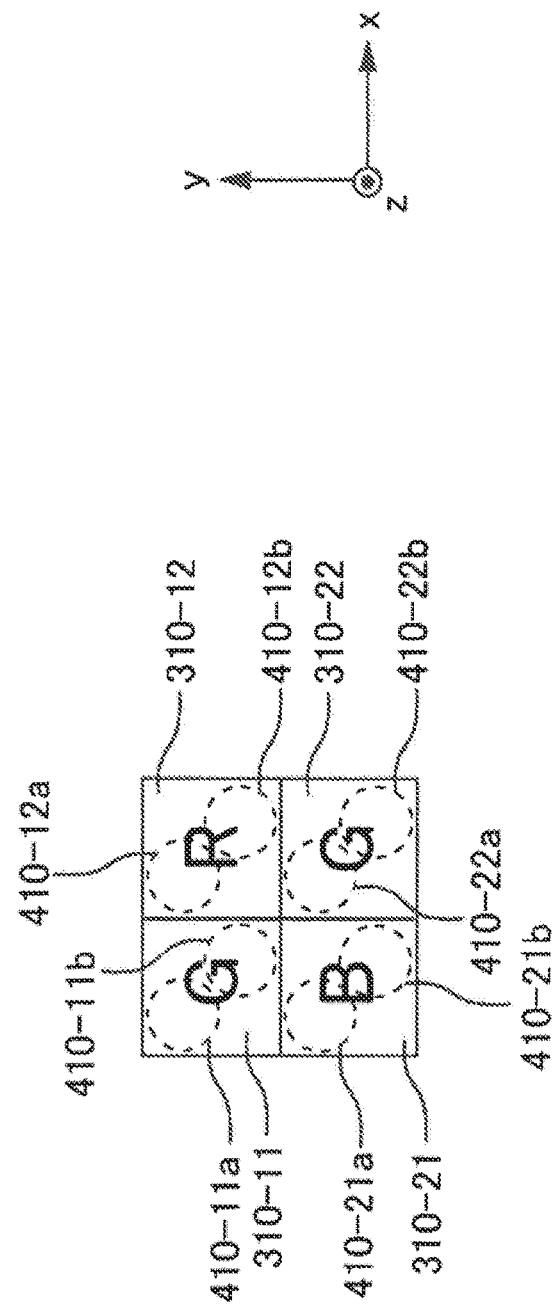
FIG. 4C schematically shows a cross-sectional view obtained by cutting the imaging module 20 at a plane parallel to the xy plane.

FIG. 4C shows a modification example in which two light tubes are provided to one photoelectric converting element 210. FIG. 4C is an enlarged cross-sectional view of the portion corresponding to the unit lattice including the color filter 310-11, the color filter 310-12, the color filter 310-21 and the color filter 310-22 in FIG. 4A.

As shown in FIG. 4C, the light tube 410-11a and the light tube 410-11b are provided to the color filter 310-11. The light tube 410-12a and the light tube 410-12b are provided to the color filter 310-12. The light tube 410-21a and the light tube 410-21b are provided to the color filter 310-21. The light tube 410-22a and the light tube 410-22b are provided to the color filter 310-22.

The light tube 410-11a and the light tube 410-11b are provided so that the light outlet of the light tube 410-11a and the light outlet of the light tube 410-11b are positioned on an inner side of four sides of the corresponding photoelectric converting element 210 within a plane parallel to the xy plane. On the cross section obtained by cutting the light tube 410 at the plane parallel to the xy plane, a length of a diameter of the light outlet of each of the light tube 410-11a and the light tube 410-11b is at least shorter than a length of one side of the photoelectric converting element 210. In a case in which the photoelectric converting element 210 has a shorter side and a longer side, the length of the diameter of the light outlet of each of the light tube 410-11a and the light tube 410-11b is at least shorter than a length of the shorter side of the photoelectric converting element 210 on the cross section obtained by cutting the light tube 410 at the plane parallel to the xy plane. The light tube 410-11a and the light tube 410-11b may be provided along a diagonal line of a quadrangle formed by four sides of the photoelectric converting element 210. In a case in which the photoelectric converting element 210 has a shorter side and a longer side, the light tube 410-11a and the light tube 410-11b may be provided along the longer side on the cross section obtained by cutting the light tube 410 at the plane parallel to the xy plane. Except these respects, each of the light tube 410-11a and the light tube 410-11b may have a similar configuration to that of the light tube 110.

Also, for the color filter 310-12 and the corresponding photoelectric converting element 210, the light tube 410-12a and the light tube 410-12b respectively have a similar configuration to that of the light tube 410-11a and the light tube 410-11b. Also, for the color filter 310-21 and the corresponding photoelectric converting element 210, the light tube 410-21a and the light tube 410-21b respectively have a similar configuration to that of the light tube 410-11a and the light tube 410-11b. Also, for the color filter 310-22 and the corresponding photoelectric converting element 210, the light tube 410-22a and the light tube 410-22b respectively have a similar configuration to that of the light tube 410-11a and the light tube 410-11b. Note that although in FIG. 4C only the portion corresponding to the unit lattice including four photoelectric converting elements 210 is shown, another color filter 310 and a corresponding photoelectric converting element 210 may also be provided with two light tubes similar to the light tube 410-22a and the light tube 410-22b.

With reference to FIG. 4C, a modification example in which two light tubes are provided to one photoelectric converting element 210 is shown. As another modification example, three or more light tubes may be provided to one photoelectric converting element 210. Also, as the modification example described with reference to FIG. 4B and FIG. 4C, in a configuration in which one or more light tubes are provided to each photoelectric converting element 210, the light diffusing portion 40 may be omitted.

Also, a shape of the cross section of the light tube 110 within the plane parallel to the xy plane is not limited to a circular shape. The light tube 110 may have various cross-section shapes other than the rectangular shape, the circular shape and the like. Also, the image capturing unit 50 may have a microlens provided to each photoelectric converting element 210.

Figure 5:
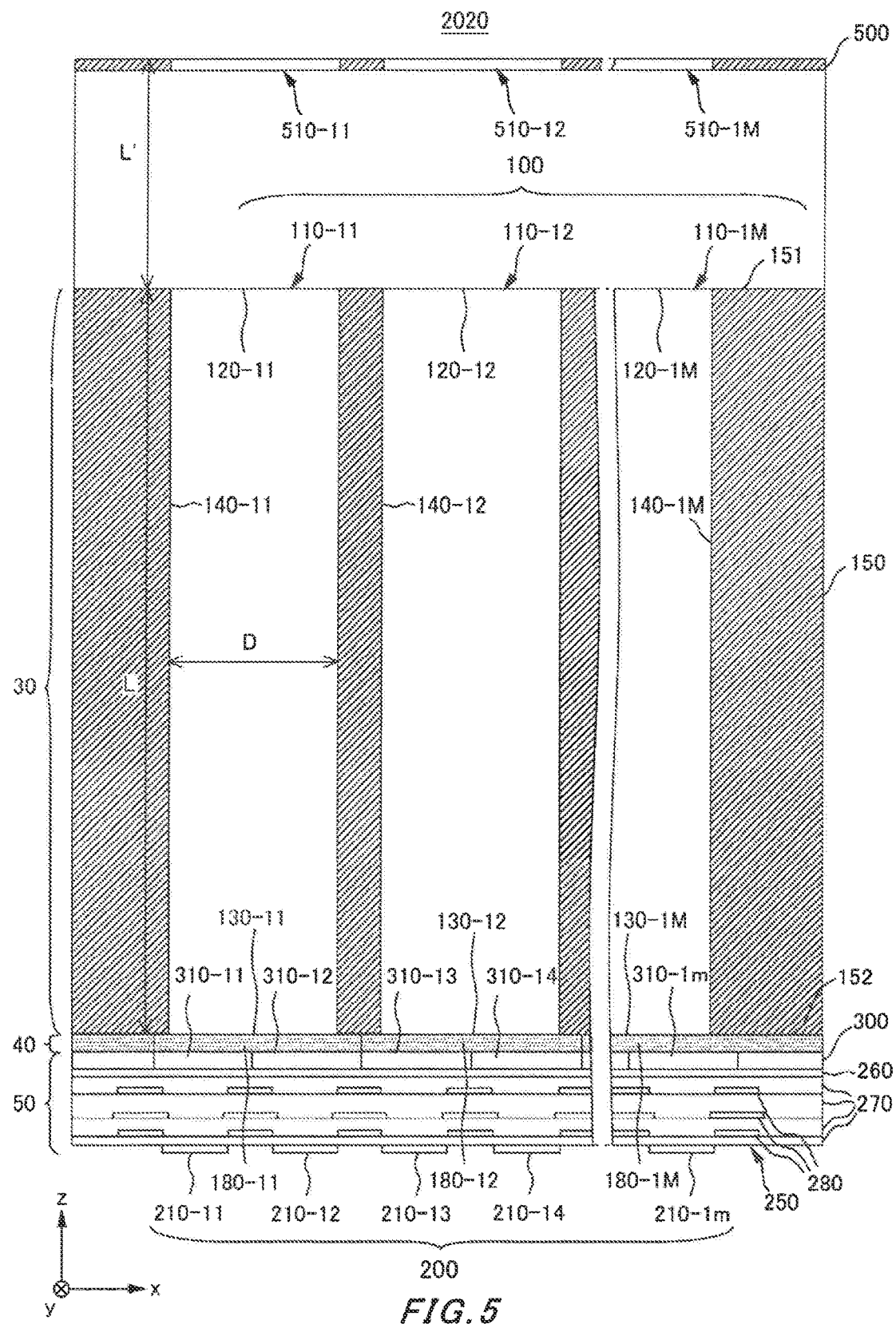
FIG. 5 shows one example of an imaging module 2020 according to a second embodiment.

FIG. 5 schematically shows one example of the imaging module 2020 according to a second embodiment. FIG. 5 shows a cross-sectional view of the same cross section as that of the FIG. 3. The imaging module 2020 further has an aperture plate 500 in addition to the components included in the imaging module 20. Among the components included in the imaging module 2020, the components to which the same reference signs as those of the components described with reference to the imaging module 20 are added have similar configurations to those of the components described with reference to the imaging module 20. For that reason, descriptions for the said components may be omitted.

The aperture plate 500 serves as one light restricting portion together with the light restricting portion 30. The aperture plate 500 is provided apart from the light restricting portion 30 on the positive side along the z axis of the light restricting portion 30. A distance in the z-axis direction from a surface of the aperture plate 500 on the subject side to the light inlet 120 is set as L'.

The aperture plate 500 has a plurality aperture portions including an aperture portion 510-11 to an aperture portion 510-1M. The plurality of aperture portions included in the aperture plate 500 are arrayed in a matrix of N rows×M columns. An aperture portion positioned on the ith row and the jth column may be called as an aperture portion 510-$ij$ by adding "-ij" to the reference sign of the aperture portion as a suffix to the reference sign. Also, the plurality of aperture portions included in the aperture plate 500 may be collectively called as the aperture portions 510.

Each aperture portion 510 is provided to the light tube 110 in one-to-one correspondence. Each aperture portion 510 is provided on an extension that is extended in the positive direction along the z axis from the corresponding light tube 110. For example, a center of each aperture portion 510 is positioned relative to the center of the corresponding light tube 110. An aperture diameter of the aperture portion 510 is D that is the same as that of the light tube 110. A length of each aperture plate 500 in the z direction is shorter than L being the length of the light tube portion 100.

Each light tube 110 emits, to each photoelectric converting element 210, the light that can straightly travel into and reach each light outlet 130 among the light passing through each aperture portion 510 and being incident on each light inlet 120, and restricts the light that cannot straightly travel into and reach each light outlet 130-11 among the light passing through each aperture portion 510 and being incident on each light inlet 120 from being emitted to each photoelectric converting element 210. According to the imaging module 2020, L in the imaging module 20 can be effectively increased to L+L'.

Specifically, the depth of field of the imaging module 2020 is substantially determined by (L+L')/D. Therefore, according to the imaging module 2020, the depth of field can be set substantially deeper compared to a case in which the aperture plate 500 is not provided. Also, according to the imaging module 2020, the length of the light tube 110 in the z-axis direction that is required for obtaining a certain depth of field can be set shorter compared to the case in which the aperture plate 500 is not provided.

Note that in the imaging module 2020 a light wave obtained by superimposing light waves being incident on the aperture portion 510 and being emitted from the aperture portion 510 is incident on the light tube 110. The microscope apparatus 10 may correct the obtained image data by image processing based on an inverse function of an optical transfer function obtained by the superimposition of the light waves.

Note that it is preferable that the side wall of the aperture portion 510 along the z axis does not reflect light, similar to the side wall 140 of the light tube 110. However, the side wall of the aperture portion 510-11 may also reflect light. Also, one or more aperture plates having the same configuration as that of the aperture plate 500 may be provided between the aperture plate 500 and the light tube 110.

Figure 6:
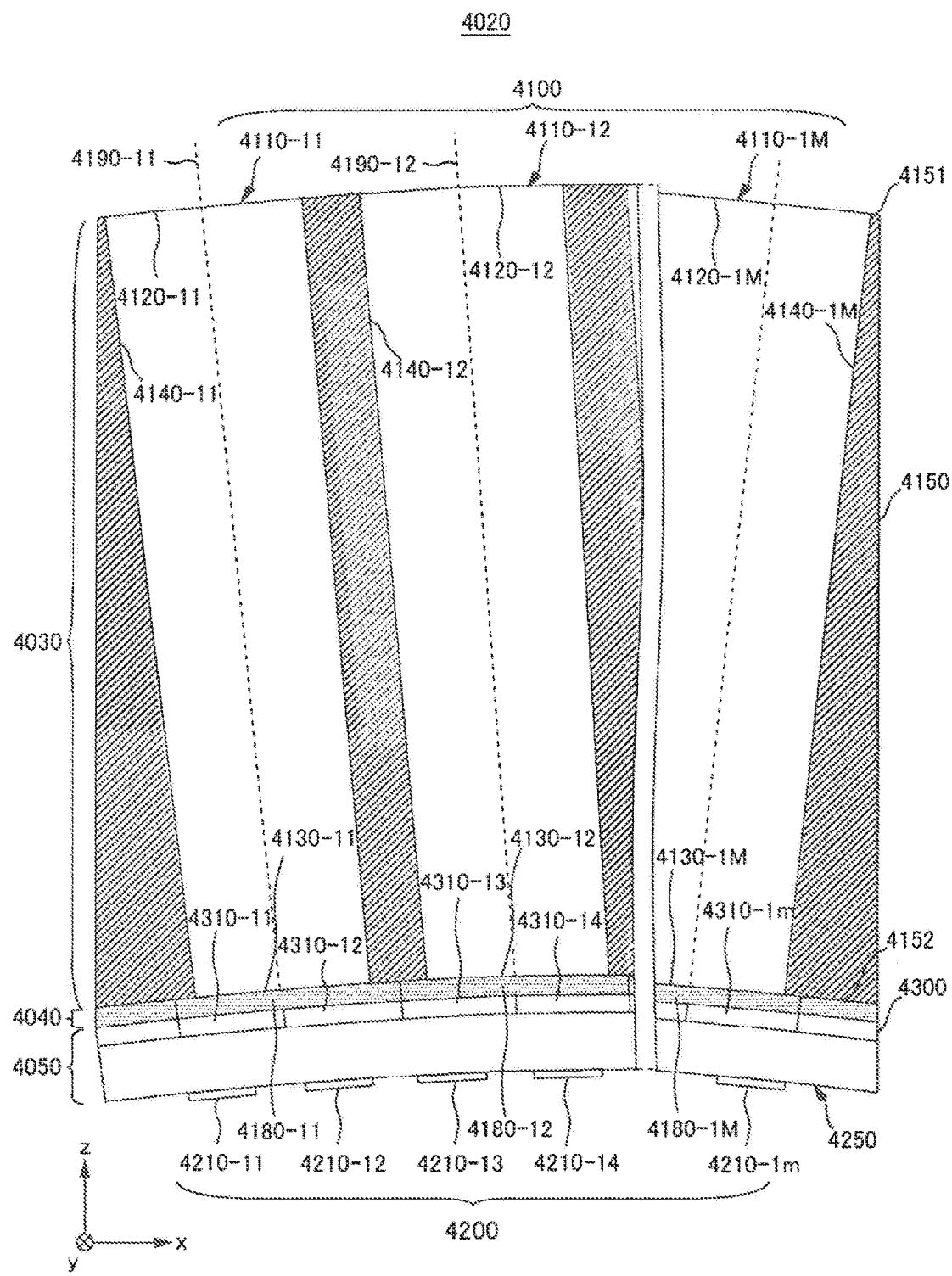
FIG. 6 shows one example of an imaging module 4020 according to a third embodiment.

FIG. 6 shows one example of the imaging module 4020 in a third embodiment. The imaging module 4020 has a light restricting portion 4030, a light diffusing portion 4040 and an image capturing unit 4050. The light restricting portion 4030 corresponds to the light restricting portion 30 in the imaging module 20. The light diffusing portion 4040 corresponds to the light diffusing portion 40 in the imaging module 20. The image capturing unit 4050 corresponds to the image capturing unit 50 in the imaging module 20. Note that when describing the components included in the imaging module 4020, a difference from corresponding components among the components included in the imaging module 20 may be described and descriptions for the other respects may be omitted.

The image capturing unit 4050 has a color filter portion 4300, a substrate portion 4250 and a photoelectric converting element portion 4200. The color filter portion 4300 corresponds to the color filter portion 300. The substrate portion 4250 corresponds to the substrate portion 250. The photoelectric converting element portion 4200 corresponds to the photoelectric converting element portion 200. Note that because the substrate portion 4250 has a similar layer configuration to that of the substrate portion 250, the illustration and the description for the substrate portion 4250 are omitted.

The substrate portion 4250 has an upwardly convex curved shape. The substrate portion 4250 has a curved shape in both cross sections in a direction along the x axis and a direction along the y axis. In this manner, the substrate portion 4250 has a three-dimensional upwardly convex curved shape. The color filter portion 4300 and the photoelectric converting element portion 4200 are formed on the curved front surface of the substrate portion 4250. The substrate portion 4250 is a flexible substrate, for example.

The color filter portion 4300 has a plurality of color filters including a color filter 4310-11 to a color filter 4310-1$m$. The plurality of color filters included in the color filter portion 4300 correspond to the color filter 310. The plurality of color filters included in the color filter portion 4300 have a similar function to that of the color filter 310 except that the plurality of color filters included in the color filter portion 4300 are formed on the curved front surface. The plurality of color filters included in the color filter portion 4300 may be collectively called as the color filters 4310.

The photoelectric converting element portion 4200 has a plurality of photoelectric converting elements including a photoelectric converting element 4210-11 to a photoelectric converting element 4210-1$m$. The plurality of photoelectric converting elements included in the photoelectric converting element portion 4200 have a similar function to that of the photoelectric converting element 210 except that the plurality of photoelectric converting elements included in the photoelectric converting element portion 4200 are formed on the curved front surface. The plurality of photoelectric converting elements included in the photoelectric converting element portion 4200 may be collectively called as the photoelectric converting elements 4210.

The light tube portion 4100 has a plurality of light tubes including a light tube 4110-11 to a light tube 4110-1M. The plurality of light tubes included in the light tube portion 4100 correspond to the light tube 110. The plurality of light tubes included in the light tube portion 4100 have a similar function to that of the light tube 110 except that the plurality of light tubes included in the light tube portion 4100 include a light tube along a direction that is substantially not parallel to the z axis. The plurality of light tubes included in the light tube portion 4100 may be collectively called as the light tubes 4110.

The light tube 110-11 is formed by a light inlet 4120-11, a light outlet 4130-11 and a side wall 4140-11. The light inlet 4120-11 corresponds to the light inlet 120-11. The light outlet 4130-11 corresponds to the light outlet 130-11. The side wall 4140-11 corresponds to the side wall 140-11.

Each light tube 4110 is a through hole formed in the base body 4150, for example. For example, each light tube 110 is a through hole that penetrates from the first surface 4151 of the base body 4150 to a second surface 4152 on an opposite side to the first surface 4151. Note that the base body 4150 corresponds to the base body 150. Similar to the base body 150, the base body 4150 may be formed of carbon and the like absorbing light. The first surface 4151 of the base body 4150 may have an upwardly convex curved shape. Also, the second surface 4152 of the base body 4150 may also have an upwardly convex curved shape.

The light tube 4110 may have a generally truncated cone shape, for example. A direction of the light tube 4110-11 is different from a direction of the light tube 4110-12. For example, an angular difference between a central axis 4190-11 of the light tube 4110-11 and a central axis 4190-12 of the light tube 4110-12 is larger than 0 degrees. Note that the central axis 4190-11 is a straight line connecting the center of the light inlet 4120-11 to the center of the light outlet 4130-11, for example. The central axis 4190-12 is a straight line connecting the center of the light inlet 4120-12 and the center of the light outlet 4130-12. The central axes of the respective light tubes 4110 may be radially arranged. It is desired that the direction of the light tube 4110 is determined so that a range in which any of the photoelectric converting elements 4210 can receive light can substantially cover the entire range of the field in an angle of view. Also, the maximum value of the angular difference between the direction of the light tube 4110 and the z axis may be determined in accordance with the angle of view required by the microscope apparatus 10.

According to the light restricting portion 4030, an incident direction of light beams that can be received by the photoelectric converting element 4210 is not substantially limited to the z-axis direction only. For that reason, according to the imaging module 4020, the image capturing can be performed at a wider angle. Note that instead of the curved image capturing unit 50, an image capturing unit in which a number of photoelectric converting elements are arranged may be used, the number of photoelectric converting element portions with a principle surface having a direction different from one another.

Figure 7:
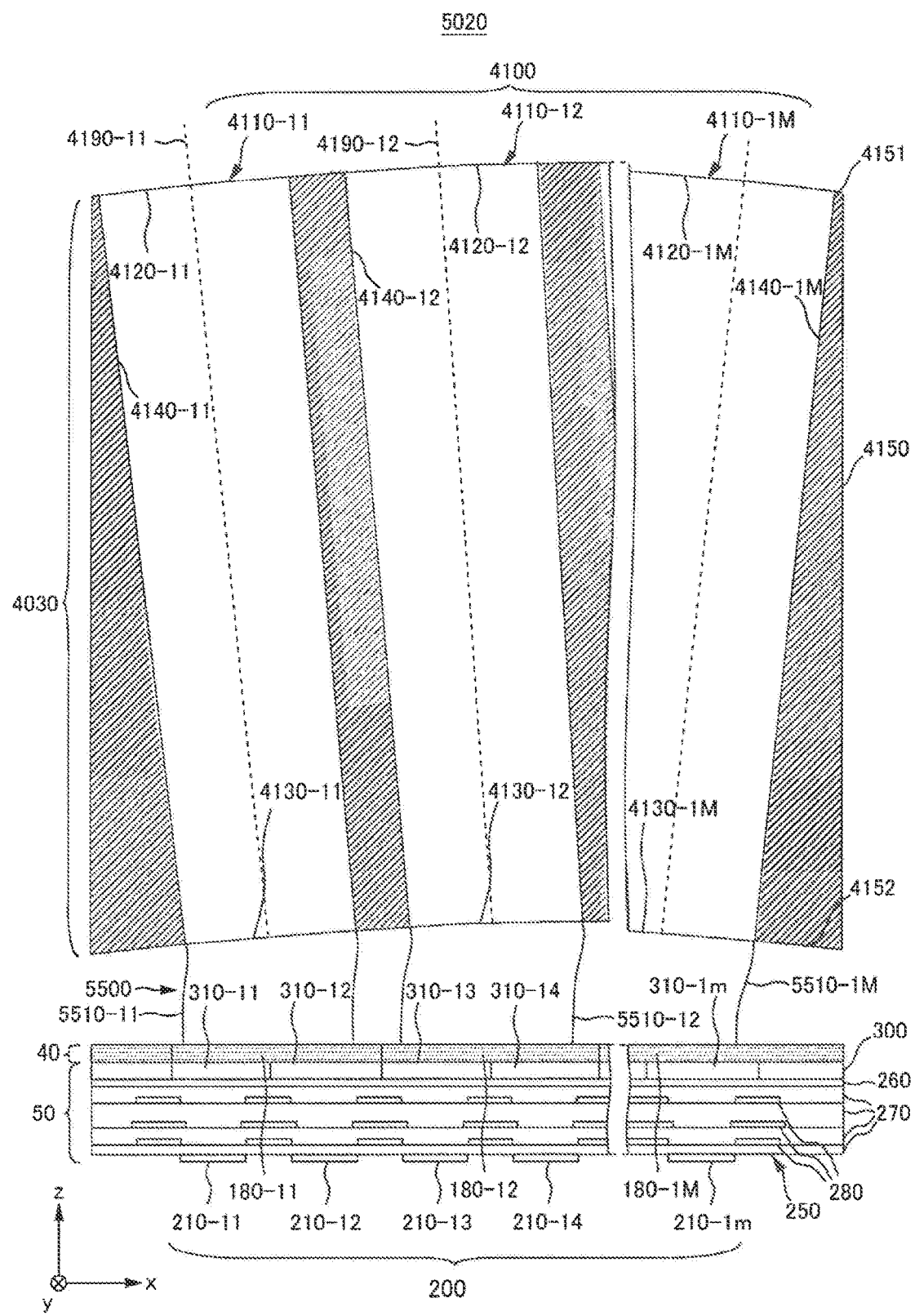
FIG. 7 shows one example of an imaging module 5020 according to a fourth embodiment.

FIG. 7 schematically shows one example of an imaging module 5020 according to a fourth embodiment. The imaging module 5020 has the light restricting portion 4030 that is described with reference to the imaging module 4020, the light diffusing portion 40 and the image capturing unit 50 that are described with reference to the imaging module 20 and the like, and the light guiding device portion 5500.

When describing the components included in the imaging module 5020, differences from corresponding components among the components included in the imaging module 20 or the imaging module 4020 may be described and descriptions for the other respects may be omitted.

The light guiding device portion 5500 is provided between the light restricting portion 4030 and the light diffusing portion 40. The light guiding device portion 5500 has a plurality of light guiding devices including a light guiding device 5510-11 to a light guiding device 5510-1M. The plurality of light guiding devices included in the light guiding device portion 5500 are provided to each light outlet 4130. A light guiding device corresponding to the light outlet 4130 on the ith row and the jth column may be called as the light guiding device 5510-*ij* by adding "-ij" to the reference sign of the light guiding device as a suffix to the reference sign. Also, the plurality of light guiding devices included in the light guiding device portion 5500 may be collectively called as the light guiding devices 5510.

Each light guiding device 5510 is, for example, an optical fiber. The light guiding device 5510 guides each light emitted from each light outlet 4130 to each light diffusing device 180. The light guided to the light diffusing device 180 by the light guiding device 5510 passes through the light diffusing device 180, is incident on the image capturing unit 50 and is incident on the corresponding photoelectric converting element 210. In this manner, the light guiding device 5510 guides each light emitted from each light outlet 4130 to each photoelectric converting element 210. For example, the light guiding device 5510-11 guides each light emitted from each light outlet 4130-11 to each corresponding photoelectric converting element 210. Note that in a case in which the light guiding device 5510 substantially has a property of diffusing light, a configuration in which the light diffusing portion 40 is not included may be applied to the light guiding device 5510.

According to the imaging module 5020, an image capturing can be performed at a wider angle by using a flat plate-like image capturing unit 50. Note that a configuration in which a similar light guiding device to the light guiding device 5510 is further included can also be applied to the imaging module 20 and the imaging module 2020.

In the present embodiment, the microscope apparatus 10 is used as one example of the image capturing apparatus. However, the image capturing apparatus is not limited to the microscope apparatus. The image capturing apparatus is a concept including various electronic devices having an image capturing function, such as a finger print sensor apparatus, a scanner, a monitor camera, a smart phone having an image capturing function, a mobile phone having an image capturing function and a mobile terminal having an image capturing function.

While the embodiments of the present invention have been described, the technical scope of the invention is not restricted to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

5 . . . microscope system; 10 . . . microscope apparatus; 11 . . . mounting surface; 20 . . . imaging module; 30 . . . light restricting portion; 40 . . . light diffusing portion; 50 . . . image capturing unit; 60 . . . cover glass; 70 . . . preparation; 80 . . . slide glass; 81 . . . first principle surface; 82 . . . second principle surface; 90 . . . sample; 100 . . . light tube portion; 110 . . . light tube; 120 . . . light inlet; 130 . . . light outlet; 140 . . . side wall; 150 . . . base body; 151 . . . first principle surface; 152 . . . second principle surface; 180 . . . light diffusing device; 200 . . . photoelectric converting element portion; 210 . . . photoelectric converting element; 250 . . . substrate portion; 260 . . . passivation layer; 270 . . . insulation layer; 280 . . . wiring layer; 300 . . . color filter portion; 310 . . . color filter; 410 . . . light tube; 500 . . . aperture plate; 510 . . . aperture portion; 2020 . . . imaging module; 4020 . . . imaging module; 4030 . . . light restricting portion; 4040 . . . light diffusing portion; 4050 . . . image capturing unit; 4100 . . . light tube portion; 4110 . . . light tube; 4120 . . . light inlet; 4130 . . . light outlet; 4140 . . . side wall; 4150 . . . base body; 4151 . . . first surface; 4152 . . . second surface; 4200 . . . photoelectric converting element portion; 4210 . . . photoelectric converting element; 4250 . . . substrate portion; 4300 . . . color filter portion; 4310 . . . color filter; 5020 . . . imaging module; 5500 . . . light guiding device portion; 5510 . . . light guiding device

What is claimed is:

1. An image capturing apparatus comprising:
   a mounting surface configured to contact a second surface of a slide glass that has a sample disposed on a first surface of the slide glass;
   a member surrounded by the mounting surface and having a cylindrical light tube that has an inlet and an outlet and that passes, among light from the sample that is incident on the inlet, light in a first direction straightly traveling through the cylindrical light tube from the inlet to the outlet while not passing light in a second direction, the second direction being different from the first direction; and
   an image capturing device that has a photoelectric converting portion that converts light from the outlet into electric charges to form an image of the sample.

2. The image capturing apparatus according to claim 1, wherein
   a length of the cylindrical light tube is longer than an aperture diameter of the inlet and of the outlet.

3. The image capturing apparatus according to claim 2, wherein
   a wall of the cylindrical light tube is formed of a material that provides more light absorptivity than light reflectivity.

4. The image capturing apparatus according to claim 1, wherein
   the photoelectric converting portion has a first photoelectric converting element and a second photoelectric converting element, and the light from the outlet is incident on both the first photoelectric converting element and the second photoelectric converting element.

5. The image capturing apparatus according to claim 4, further comprising a light diffusing portion that is arranged between the member and the image capturing device and that diffuses the light from the outlet, wherein
the light from the outlet is incident on both the first photoelectric converting element and the second photoelectric converting element via the light diffusing portion.

6. The image capturing apparatus according to claim 5, wherein
the image capturing device has a first filter that has a first spectral characteristic and a second filter that has a second spectral characteristic that is different from the first spectral characteristic,
the light from the outlet is incident on the first photoelectric converting element via the first filter, and
the light from the outlet is incident on the second photoelectric converting element via the second filter.

7. The image capturing apparatus according to claim 1, wherein
the image capturing apparatus does not have any imaging lens between the inlet and the sample.

8. An image capturing apparatus comprising:
a mounting surface configured to contact a second surface of a slide glass that has a sample disposed on a first surface of the slide glass;
a member surrounded by the mounting surface and that has an inlet and an outlet, and that has a plurality of cylindrical light tubes passing light, among light from the sample that is incident on the inlet, in a first direction straightly traveling through the cylindrical light tubes from the inlet to the outlet while not passing light in a second direction that is different from the first direction; and
an image capturing device that has a plurality of photoelectric converting elements that each converts light from the outlet into electric charges to form an image of the sample.

9. The image capturing apparatus according to claim 8, wherein
lengths of the cylindrical light tubes are longer than an aperture diameter of the inlet and of the outlet.

10. The image capturing apparatus according to claim 8, wherein
the image capturing device has a first photoelectric converting element and a second photoelectric converting element among the plurality of photoelectric converting elements, and the light from the outlet is incident on both the first photoelectric converting element and the second photoelectric converting element.

11. The image capturing apparatus according to claim 10, further comprising a light diffusing portion that is arranged between the member and the image capturing device and that diffuses the light from the outlet, wherein
the light from the outlet is incident on both the first photoelectric converting element and the second photoelectric converting element via the light diffusing portion.

12. The image capturing apparatus according to claim 11, wherein
the image capturing device has a first filter that has a first spectral characteristic and a second filter that has a second spectral characteristic that is different from the first spectral characteristic,
the light from the outlet is incident on the first photoelectric converting element via the first filter, and
the light from the outlet is incident on the second photoelectric converting element via the second filter.

13. The image capturing apparatus according to claim 8, wherein
walls of the cylindrical light tubes are formed of a material that provides more light absorptivity than light reflectivity.

14. An image capturing apparatus comprising:
a mounting surface configured to contact a second surface of a slide glass that has a sample disposed on a first surface of the slide glass;
an image capturing device that has a plurality of photoelectric converting elements; and
a plurality of cylindrical light tubes surrounded by the mounting surface and that each have a light inlet and a light outlet, and that emit, to the photoelectric converting elements, light from the sample that reaches the light outlets after straightly traveling through the cylindrical light tubes among the light from the sample that is incident on the light inlets, and that restrict the light from the sample that does not reach the light outlets among the light from the sample that is incident on the light inlets from being emitted to the photoelectric converting elements, so that the image capturing device forms an image of the sample with the light emitted from the outlets.

15. The image capturing apparatus according to claim 14, wherein
side walls of the cylindrical light tubes do not reflect the light.

16. The image capturing apparatus according to claim 15, further comprising
an aperture plate provided apart from the light inlets of the cylindrical light tubes and that has a plurality of apertures on which the light from the sample is incident, and wherein
the light from the sample that has passed through the apertures is incident on the light inlets.

17. The image capturing apparatus according to claim 15, wherein
the side walls are formed of a material that provides more light absorptivity than light reflectivity.

18. The image capturing apparatus according to claim 15, wherein
the cylindrical light tubes are filled with a material that has a uniform refractive index.

19. The image capturing apparatus according to claim 14, wherein
directions of a plurality of light rays emitted from the light outlets and passing through the light inlets are different from one another.

20. The image capturing apparatus according to claim 14, further comprising
a plurality of light guiding devices that guide light emitted from the light outlets to the photoelectric converting elements.

* * * * *